Oct. 19, 1965  R. J. SWAN ET AL  3,212,685
SYRINGES FOR DISPENSING PASTE OR THE LIKE
Filed Oct. 26, 1961  2 Sheets-Sheet 1
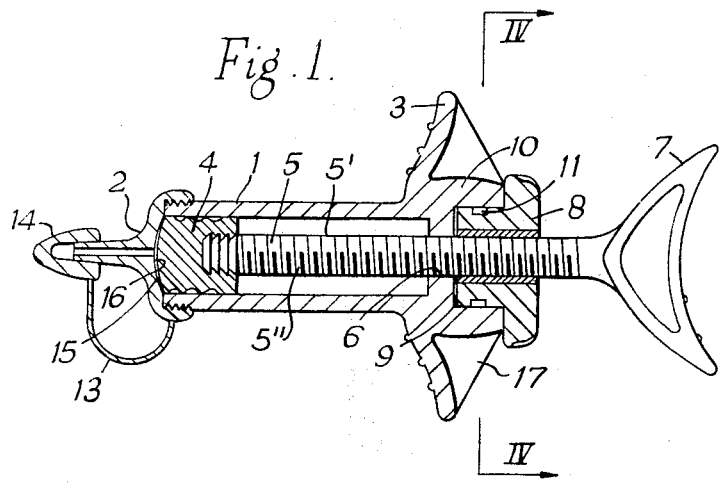
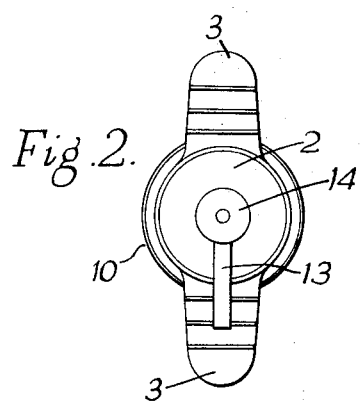
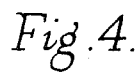
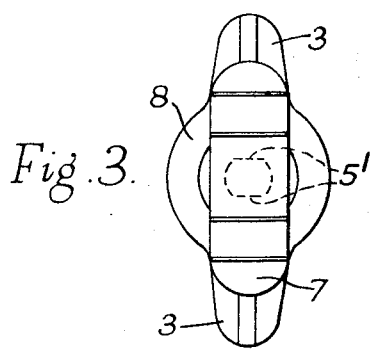
INVENTORS
Richard J. Swan
Julius P. Steindler
BY Kenyon Palmer,
Stewart & Estabrook
ATTORNEYS United States Patent Office 3,212,685
Patented Oct. 19, 1965

3,212,685
SYRINGES FOR DISPENSING PASTE
OR THE LIKE
Richard James Swan, London, England, and Julius P. Steindler, Chicago, Ill., assignors to Engis Equipment Company, Chicago, Ill., a corporation of Illinois
Filed Oct. 26, 1961, Ser. No. 147,868
Claims priority, application Great Britain, Nov. 2, 1960, 37,695/60
3 Claims. (Cl. 222—386)

The present invention relates to syringes for dispensing paste or the like and particularly, but not exclusively, for dispensing a diamond abrasive compound made up in the form of a paste.

It is an object of this invention to provide an improved syringe which is convenient for single-handed operation and at the same time is capable of delivering accurately metered small quantities of paste or the like.

A further object is to provide an improved syringe which is capable of ejecting substantially its entire contents.

The improved syringe according to this invention comprises a cylindrical barrel having a nozzle at one end thereof; a piston ararnged for longitudinal axial movement in the barrel; a plunger connected at one end to the piston, extending outwardly through a bearing in the other end of the barrel and having a handle on its outer end, the plunger being axially slidable through, but not rotatable in, said bearing; and a finger nut screwed on the plunger and mounted in the other end of the barrel so that it is rotatable, but constrained against axial movement with respect thereto; gripping surfaces being provided on the barrel or on the handle whereby the barrel and handle can be held against rotation by fingers, or by fingers and the palm, of one hand, while the thumb or the thumb and index finger of the same hand can be used to rotate the finger nut.

Preferably, the piston is made of a resilient material such as neoprene or polythene and has a convex curved crown end surface adapted to co-operate at the end of the delivery stroke of the piston with a concave inner end surface of the nozzle, this concave inner end surface being of smaller radius than the convex crown end surface of the piston. The different radii of curvature of these two curved end surfaces, together with resilience of the material of which the piston is composed make possible substantially complete emptying of the barrel at the end of the delivery stroke of the piston, since the two curved surfaces first make contact in a region near the circumference of the bore in the barrel and subsequently, as the piston is forced against the nozzle, it yields so that the area of mutual contact between the two curved end surfaces is progressively enlarged in the direction towards the central axis of the barrel.

The invention will now be described by way of example with reference to the accompanying drawings, in which:

FIG. 1 is a longitudinal axial section through a syringe according to one embodiment of this invention, FIG. 2 is an end elevation of the nozzle end of the syringe, FIG. 3 is an end elevation of the end of the syringe remote from the nozzle end, FIG. 4 is a cross-section on the line IV—IV in FIG. 1.

Like parts are indicated by the same references in the several figures of the drawings.

Figure 5:
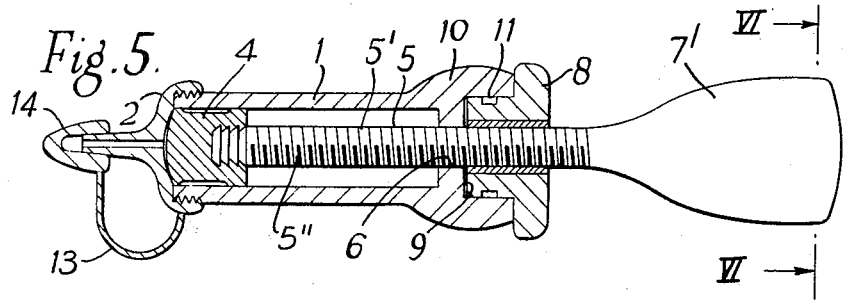
FIG. 5 is a longitudinal axial section through a syringe according to another embodiment of this invention.

The syringe illustrated in FIGS. 1 to 4 of the drawings is intended primarily for use in dispensing small metered quantities of an abrasive paste in which the active abrasive constituent consists wholly or mainly of diamond dust.

This syringe has a cylindrical nylon barrel 1 which is externally screw-threaded at one end, which will be referred to as the "nozzle end," to receive a removable nylon nozzle 2. In the region of its other end, which will be referred to as the "handle end," the barrel 1 is provided with two diametrically opposite laterally projecting finger pieces 3. A piston 4 of the resilient material known as neoprene, which is slidably arranged in the bore of the barrel 1, is secured to the inner end of a metal plunger 5. This plunger is formed on its top and bottom with flats 5', the remaining two sides which are part cylindrical being formed with screw threads 5''. The plunger 5 extends outwardly through an opening 6 in the handle end part of the barrel, which opening 6 has a cross-section formed with flats which co-operate with the flats 5' on the plunger to prevent rotation of the latter in the barrel. On the outer end of the plunger 5 is a crutch-handle 7. On the plunger 5, which is formed with a left-hand screw-thread, is screwed a knurled nut 8, part of which is accommodated in a cylindrical recess 9 formed in a boss 10 on the handle end of the barrel and is formed with an annular groove 11. Projecting into this groove 11 are the plain cylindrical end parts of two grub screws 12 which are engaged respectively in two diametrically opposite screw-threaded bores in the boss 10. Consequently, the knurled nut 8 is free to rotate, but is prevented from being displaced axially, with respect to the barrel 1.

Connected to the nozzle 2 by a strap 13 is a nylon dust cap 14.

The finger pieces 3 are supported against the boss 10 by webs 17.

The end surface 15 of the piston 4 facing the nozzle 2 is of convex curved shape and the opposite inner surface 16 of the nozzle is of concave curved shape, the curvature of this nozzle surface having a larger radius than the end surface of the piston.

In use, the operator holds the syringe in one hand, with the crutch handle 7 supported between the first finger and thumb and with the first and second fingers engaged round the finger-pieces 3. The thumb of this hand is thus left free for rotating the knurled nut 8. Rotation of the knurled nut 8 imparts axial movement to the plunger 5 and pistion 4, since the plunger is prevented from rotating in the barrel 1 by engagement of the flats 5' with the corresponding flats on the upper and lower sides of the opening 9.

Throughout the delivery stroke of the piston 4 until it first makes contact with the nozzle 2, the amount of paste which it will eject is directly proportional to the angle through which the knurled nut 8 is rotated. Due to the difference in curvature of the surfaces 15, 16, the first contact between the piston crown and the nozzle is made in the region near the circumference of the bore of the barrel. Continued rotation of the knurled nut 8 will cause the piston to be resiliently deformed so that the area of mutual contact between the two curved surfaces 15, 16 is progressively enlarged in the direction towards the central axis of the barrel. Thus, all the paste, except for a very small amount in the bore of the nozzle, will be discharged from the syringe. The possibility of complete emptying of the barrel is an impotrant advantage when such syringes are used for dispensing costly materials, such as diamond abrasive compounds.

Figure 6:
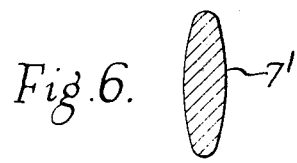
FIG. 6 is a section on the line VI—VI in FIG. 5.

The syringe illustrated in FIGS. 5 and 6 of the drawings is similar to the syringe according to FIGS. 1 to 4 in that it has a nylon barrel 1, a removable nylon nozzle 2 to which is connected by a strap 13 a nylon dustcap 14. It is also provided with a piston 4 which is slidably arranged in the bore of the barrel 1 and is secured to the inner end of a metal plunger 5. The top and bottom surfaces of the plunger 5, as seen in FIG. 5, are formed with flats similar to the flats 5' of the plunger 5 shown in FIG. 4 to prevent rotation of the plunger in the opening 6, and its remaining two sides are formed with screw threads 5". On the plunger 5 is screwed a knurled nut 8, part of which is accommodated in a cylindrical recess 9 formed in a boss 10 on the handle end of the barrel 1 and is formed with an annular groove 11. Projecting into this annular groove 11 are plain cylindrical end parts of two grub screws (not shown in FIG. 5, but similar to the grub screws 12 in FIG. 4) which prevent axial displacement of the knurled nut 8, but permit it to rotate, with respect to the barrel 1.

Apart from the fact that the screw threads on the plunger 5 in FIG. 5 may, if desired, be right-handed instead of left-handed as in FIGS. 1 to 4, this embodiment of the invention differs from the embodiment first described in that the finger pieces 3 and the corresponding webs 17 have been omitted and in that the crutch-handle 7 (FIG. 1) is replaced by a spatulate handle 7' which is shaped (set FIGS. 5 and 6) so that it can rest comfortably in the palm of the user's hand.

The end surface 15 of the piston 4 and the opposite inner surface 16 of the nozzle 2 have different curvature as, and for the purposes discribed with reference to, FIGS. 1 to 4.

Figure 7:
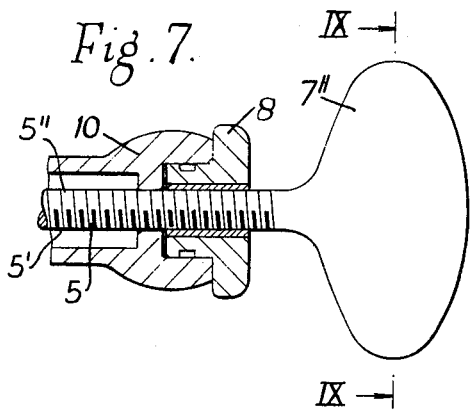
FIG. 7 is a fragmentary longitudinal axial section of a variant of the syringe according to FIG. 5, and FIGS. 8 and 9 are respectively sections on the lines VIII—VIII and IX—IX in FIG. 6.
Figure 8:
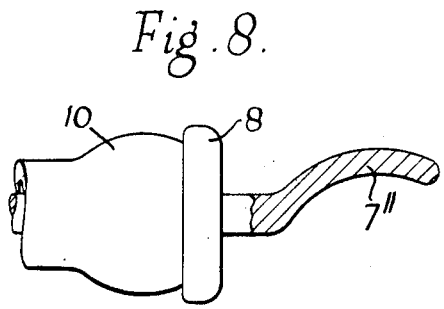
Figure 9:
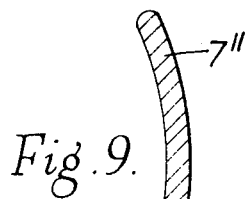

In use, the operator holds the syringe according to FIGS. 5 and 6 in one hand with the handle 7' resting in the palm and held against the latter by the second, third and fourth fingers. The index finger and thumb are thus left free for rotating the knurled nut 8. Otherwise the operation of the syringe according to this embodiment is similar to that according to the embodiment according to FIGS. 1 to 4. The variant shown in FIGS. 7 to 9 differs from the embodiment shown in FIGS. 5 and 6 only in the shape of handle 7" which corresponds to that of a short wide spoon. The convex side of this spoon-shaped handle is adapted to lie in the hollow of the user's hand, while the concave side is adapted to receive the second, third and fourth fingers of the same hand.

We claim:

1. A syringe for dispensing a pasty substance, comprising:

a cylindrical barrel having a rear end wall formed with a central guide opening;

a nozzle secured on the front end of the barrel and having a part-spherical, concave inner end surface from which extends a narrow exit passage for the pasty substance, of which at least the inner end lies on the axis of the barrel;

a piston arranged for sliding axial movement in the barrel, said piston being composed of a resilient yielding material and have a part-spherical convex crown end surface of larger radius than the inner end surface of the nozzle and adapted to cooperate therewith at the end of the delivery stroke of the piston;

a plunger connected at one end to said piston extending outwardly through the central guide opening in the rear end wall and having a handle on its externally projecting rear end, said plunger being axially slidable through but not rotatable in said central guide opening;

and a finger nut screwed on the plunger and mounted on the rear end of the barrel so that it is rotatable thereon but constrained against axial displacement with respect thereto.

2. A syringe as claimed in claim 1, wherein said handle is crutch-shaped so as to fit in the cleft between the thumb and index finger of the one hand and wherein laterally projecting finger pieces are disposed on opposite sides of said barrel adjacent the rear end thereof to provide gripping surfaces.

3. A syringe as claimed in claim 1, wherein the handle is of spatulate shape so as to fit in the palm of the hand.

References Cited by the Examiner

UNITED STATES PATENTS

| 584,275 | 6/97 | Sevier | 222—562 X |
|---|---|---|---|
| 1,252,719 | 1/18 | Proctor | 15—556 |
| 1,253,917 | 1/18 | Wern | 222—386 |
| 1,886,022 | 11/32 | Hutton | 222—309 |
| 2,343,026 | 2/44 | Radbruch | 222—386 |
| 2,736,315 | 2/56 | Feeney. | |
| 2,826,339 | 3/58 | Maillard | 222—390 X |
| 2,886,218 | 5/59 | Marcus | 222—562 X |

FOREIGN PATENTS 594,003　10/47　Great Britain.

SAMUEL F. COLEMAN, *Primary Examiner.*

LAVERNE D. GEIGER, ERNEST A. FALLER, LOUIS J. DEMBO, *Examiners.*